United States Patent
Ojima (10) Patent No.: US 10,981,329 B2
(45) Date of Patent: Apr. 20, 2021

(54) POWDER SINTERING LAMINATION APPARATUS

(71) Applicant: ENPLAS CORPORATION, Saitama (JP)

(72) Inventor: Masaaki Ojima, Saitama (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 16/079,385

(22) PCT Filed: Jan. 12, 2017

(86) PCT No.: PCT/JP2017/000728
§ 371 (c)(1),
(2) Date: Aug. 23, 2018

(87) PCT Pub. No.: WO2017/145544
PCT Pub. Date: Aug. 31, 2017

(65) Prior Publication Data
US 2019/0047220 A1 Feb. 14, 2019

(30) Foreign Application Priority Data
Feb. 24, 2016 (JP) .............................. JP2016-032669

(51) Int. Cl.
*B29C 64/371* (2017.01)
*B29C 64/214* (2017.01)
(Continued)

(52) U.S. Cl.
CPC .......... *B29C 64/214* (2017.08); *B29C 64/268* (2017.08); *B33Y 30/00* (2014.12);
(Continued)

(58) Field of Classification Search
CPC .... B29C 64/205; B29C 64/214; B29C 64/218
See application file for complete search history.

(56) References Cited

U.S. PATENT DOCUMENTS

| | | | | |
|---|---|---|---|---|
| 2004/0182510 A1* | 9/2004 | Pfeifer | ............... | B29C 64/165 156/284 |
| 2007/0126157 A1* | 6/2007 | Bredt | ............... | B29C 64/165 264/334 |

(Continued)

FOREIGN PATENT DOCUMENTS

| | | |
|---|---|---|
| JP | 2010-228332 | 10/2010 |
| JP | 2011-26668 | 2/2011 |

(Continued)

OTHER PUBLICATIONS

International Search Report dated Feb. 28, 2017 in International (PCT) Application No. PCT/JP2017/000728.

*Primary Examiner* — Timothy Kennedy
(74) *Attorney, Agent, or Firm* — Wenderoth, Lind & Ponack, L.L.P.

(57) ABSTRACT

A powder sintering lamination apparatus forms a powder layer having a predetermined thickness from a fiber-containing resin powder supplied onto a shaping table using a flattening device. The apparatus irradiates a predetermined place of the powder layer on the shaping table with laser light from a laser light irradiation module, sinters the part of the powder layer irradiated with the laser light to form a solidified layer, and forms a three-dimensional shaped object on the shaping table by laminating a plurality of the solidified layers integrally with each other. The flattening device includes a first blade and a second blade that move in different directions. The movement track of the first blade on the shaping table orthogonally intersects with the movement track of the second blade on the shaping table. The first blade and the second blade move alternately on the shaping table.

5 Claims, 12 Drawing Sheets

(51) Int. Cl.
   *B33Y 30/00* (2015.01)
   *B29C 64/268* (2017.01)
   *B22F 3/105* (2006.01)
   *C22C 47/14* (2006.01)
   *B22F 3/00* (2021.01)
   *B29C 64/153* (2017.01)
   *B33Y 10/00* (2015.01)

(52) U.S. Cl.
   CPC .............. *B22F 3/008* (2013.01); *B22F 3/1055* (2013.01); *B22F 2003/1056* (2013.01); *B29C 64/153* (2017.08); *B33Y 10/00* (2014.12); *C22C 47/14* (2013.01); *Y02P 10/25* (2015.11)

(56) References Cited

U.S. PATENT DOCUMENTS

| | | | |
|---|---|---|---|
| 2008/0018018 A1* | 1/2008 | Nielsen | B29C 64/165 264/308 |
| 2015/0005920 A1* | 1/2015 | Matsumoto | B29C 64/165 700/119 |
| 2015/0246485 A1* | 9/2015 | Guenster | B29C 64/165 264/511 |
| 2015/0375340 A1 | 12/2015 | Cui et al. | |
| 2016/0151973 A1* | 6/2016 | Juan Jover | B29C 64/386 264/462 |
| 2016/0354840 A1* | 12/2016 | Kulinsky | B29C 64/218 |
| 2017/0368748 A1* | 12/2017 | De Pena | B29C 64/393 |
| 2018/0264735 A1* | 9/2018 | Vilajosana | B29C 64/165 |
| 2018/0354190 A1* | 12/2018 | Todorov | B29C 64/218 |

FOREIGN PATENT DOCUMENTS

| | | | | |
|---|---|---|---|---|
| JP | | 2016-14188 | 1/2016 | |
| WO | WO-2004091834 A1 * | | 10/2004 | ............... B28B 1/00 |

\* cited by examiner

POWDER SINTERING LAMINATION APPARATUS

TECHNICAL FIELD

The present invention relates to a powder sintering lamination apparatus that forms a three-dimensional shaped object using a powder material.

BACKGROUND ART

A device (powder sintering lamination apparatus) that forms a three-dimensional shaped object using the powder sintering laminate method has come into widespread use in recent years. This powder sintering lamination apparatus forms a three-dimensional shaped object on a shaping table, the three-dimensional shaped object including a plurality of solidified layers laminated integrally with each other by repeating the process in which a powder material accommodated in a powder material tank is carried onto the shaping table using a blade, a powder layer having a predetermined thickness is formed on the shaping table from the powder material using the blade, a predetermined place of the powder layer on the shaping table is irradiated with laser light from laser light irradiation means, and the part of the powder layer irradiated with the laser light is sintered (solidified) (see JP-A-2011-26668).

However, since the blade reciprocates only in one direction (for example, the direction along the X axis direction or the direction along the Y axis direction when the upper surface of the shaping table is assumed to be the X-Y plane) in the conventional powder sintering lamination apparatus, when fiber-containing resin powder is used as the powder material, the orientations of fibers 101 are aligned in one direction (see FIG. 7B), thereby causing a problem in that the strength and dimensional accuracy of a three-dimensional shaped object 100 differ significantly between directions (for example, the X axis direction and the Y axis direction).

Therefore, the invention provides a powder sintering lamination apparatus that prevents the strength and dimensional accuracy of a three-dimensional shaped object from differing significantly between directions when fiber-containing resin powder is used as the powder material.

Solution to Problem

The invention relates to a powder sintering lamination apparatus 1, 41 including flattening device 7 that moves on a shaping table 4 and forms a powder layer 6 having a predetermined thickness from a powder material supplied onto the shaping table 4. A laser light irradiation module 10 irradiates a predetermined place of the powder layer 6 on the shaping table 4 with laser light 8 and sinters a part of the powder layer 6 irradiated with the laser light 8 to form a solidified layer 37, and a three-dimensional shaped object 38 is formed by laminating a plurality of the solidified layers 37 integrally with each other on the shaping table 4. In the invention, the flattening device 7 includes a first flattening mechanism 7a, 44 and a second flattening mechanism 7b, 48 that move in different directions. A movement track of the first flattening mechanism 7a, 44 on the shaping table intersects with a movement track of the second flattening mechanism 7b, 48 on the shaping table 4. The powder layer 6 formed by moving the first flattening mechanism 7a, 44 and the powder layer 6 formed by moving the second flattening mechanism 7b, 48 are laminated with each other on the shaping table 4.

Advantageous Effects of Invention

According to the invention, since the orientations of fibers of laminated solidified layers intersect with each other when a fiber-containing resin material is used as the powder material, the strength and dimensional accuracy of a three-dimensional shaped object do not differ significantly between directions (for example, the X axis direction and the Y axis direction on the X-Y plane).

DESCRIPTION OF EMBODIMENTS

Embodiments of the invention will be described below with reference to the drawings.

First Embodiment (Structure of the Powder Sintering Lamination Apparatus)

Figure 1:
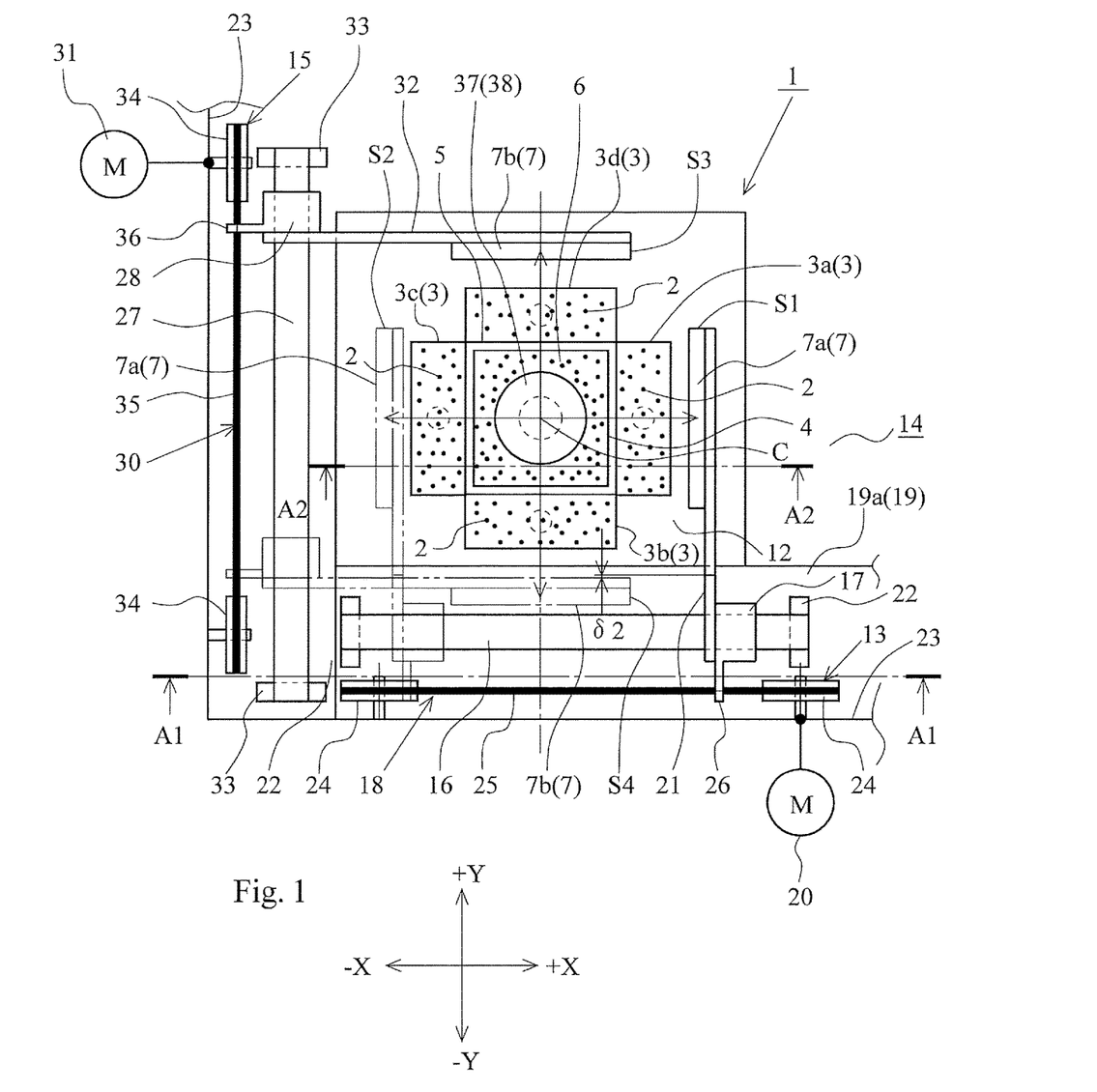
FIG. 1 is a plan view illustrating a powder sintering lamination apparatus according to a first embodiment of the invention from which a part has been removed.
Figure 2A:
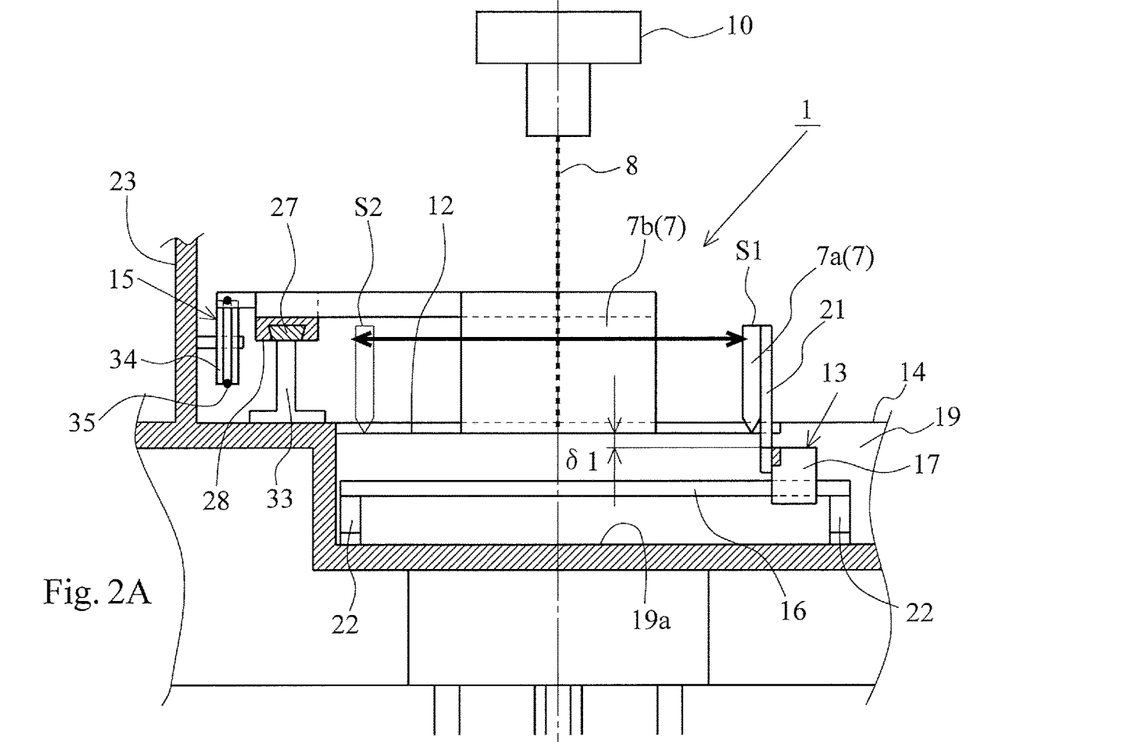
FIG. 2A is a sectional view illustrating the powder sintering lamination apparatus taken along line A1-A1 in FIG. 1.
Figure 2B:
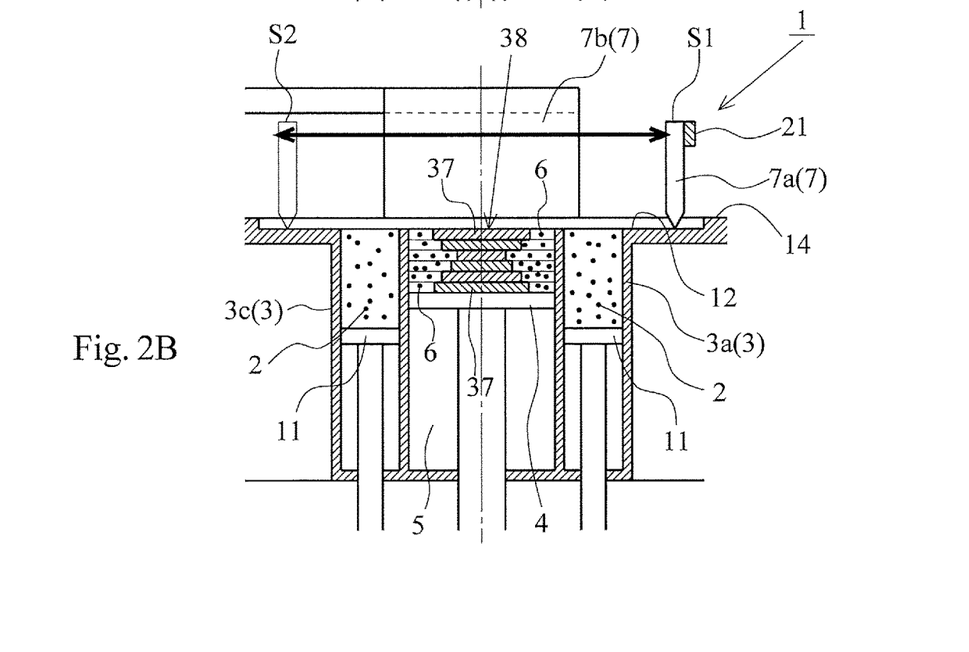
FIG. 2B is a sectional view illustrating the powder sintering lamination apparatus taken along line A2-A2 in FIG. 1.

FIG. 1 is a plan view illustrating a powder sintering lamination apparatus 1 according to the first embodiment of the invention from which a part has been removed. In addition, FIG. 2A is a sectional view illustrating the powder sintering lamination apparatus 1 taken along line A1-A1 in FIG. 1. In addition, FIG. 2B is a sectional view illustrating the powder sintering lamination apparatus 1 taken along line A2-A2 in FIG. 1.

As illustrated in these drawings, the powder sintering lamination apparatus 1 according to the embodiment includes powder material tanks 3 in which fiber-containing resin powder 2 (abbreviated below as the resin powder) is accommodated, a shaping tank 5 in which a shaping table 4 is accommodated so as to be movable up and down, the flattening device 7 that carries the resin powder 2 in the powder material tanks 3 onto the shaping table 4 and forms a powder layer 6 having a predetermined thickness on the shaping table 4, and the laser light irradiation module 10 that irradiates the powder layer 6 of the shaping table 4 with laser light 8. It should be noted here that the operation of the laser light irradiation module 10 is controlled on the basis of input data such as three-dimensional CAD data.

Each of the powder material tanks 3 accommodates a powder table 11 movable up and down and the resin powder 2 can be supplied to the shaping table 4 by the amount corresponding to the moving up of the powder table 11. The powder material tank 3 is provided along each of the four sides of the shaping tank 5 that is rectangular in plan view. The powder table 11 is moved up and down by a drive device (for example, a power transmission mechanism including a motor and a gear train) that is not illustrated. It should be noted here that the powder material tank 3 positioned in the +X axis direction with respect to the center C of the shaping tank 5 is represented as a first powder material tank 3a, and the other three powder material tanks 3 arranged clockwise from the first powder material tank 3a are represented as second to fourth powder material tanks 3b to 3d of the four powder material tanks 3 in FIG. 1.

The shaping tank 5 has a cylindrical body that is rectangular in plan view and the rectangular shaping table 4 is accommodated in the cylindrical body so as to be movable up and down. The shaping table 4 is moved up and down by a drive device (for example, a power transmission mechanism including a motor and a gear train) that is not illustrated and is lowered by the amount corresponding to the thickness of the powder layer 6 (for each of the powder layers 6) formed on the shaping table 4.

The flattening device 7 includes a first blade 7a (first flattening mechanism) that reciprocates along the X axis direction of the X-Y plane in FIG. 1 and a second blade 7b (second flattening mechanism) that reciprocates along the Y axis direction of the X-Y plane in FIG. 1.

The first blade 7a is a long plate made of a resin material or a metal material, is formed to have a length that projects from both sides along the Y axis direction of the shaping table 4, and the lower edge thereof is movably disposed on a work guide surface 12 so as to have contact or a small clearance therebetween. This first blade 7a is moved by first blade drive element 13 between the position (first stop position S1) displaced in the +X axis direction from the first powder material tank 3a and the position (second stop position S2) displaced in the −X axis direction from the third powder material tank 3c. This causes the first blade 7a to supply the resin powder 2 in the first powder material tank 3a or the third powder material tank 3c onto the shaping table 4 and forms the powder layer 6 having a predetermined thickness on the shaping table 4. It should be noted here that the work guide surface 12 is the bottom surface of a rectangular recess formed on the upper surface of a work table 14.

The second blade 7b is a long plate made of a resin material or a metal material, is formed to have a length that projects from both sides along the X axis direction of the shaping table 4, and the lower edge thereof is movably disposed on the work guide surface 12 so as to have contact or a small clearance therebetween. This second blade 7b is moved by second blade drive element 15 between the position (third stop position S3) displaced in the +Y axis direction from the fourth powder material tank 3d and the position (fourth stop position S4) displaced in the −Y axis direction from the second powder material tank 3b. This causes the second blade 7b to supply the resin powder 2 in the second powder material tank 3b or the fourth powder material tank 3d onto the shaping table 4 and forms the powder layer 6 having a predetermined thickness on the shaping table 4.

The first blade drive element 13 includes a guide rail 16 that extends along the X axis direction, a slider 17 that is slidably engaged with the guide rail 16, a winding transmission device 18 that slidably moves the slider 17, a motor 20 that drives the winding transmission device 18, and a support arm 21 that fixes the first blade 7a to the slider 17. The guide rail 16 is fixed to a bottom surface 19a of a blade drive element accommodation concave place 19 formed on the work table 14 via a pair of support legs 22 and 22 and can reciprocate the first blade 7a between the first stop position S1 and the second stop position S2 by guiding the slider 17 in the direction along the X axis. In addition, since the slider 17 has a dovetail shape (shape of an upside-down isosceles trapezoid) groove to be slidably engaged with the guide rail 16 having a dovetail shape, the slider 17 smoothly moves along the guide rail 16 without coining off the guide rail 16. The winding transmission device 18 has a pair of pulleys 24 and 24 rotatably attached to a frame 23 of the device body and an endless wire belt 25 looped over the pair of pulleys 24 and 24. A hook 26 of the slider 17 is fixed to the wire belt 25. Accordingly, the slider 17 slidably moves on the guide rail 16 as the wire belt 25 runs. Then, one of the pair of pulleys 24 and 24 is rotated by the motor 20 and the other of the pair of pulleys 24 and 24 is driven by one of the pair of pulleys 24 and 24. This first blade drive element 13 is accommodated and installed in the blade drive element accommodation concave place 19 so as to produce a clearance δ1 between the lower edge of the second blade 7b that stops at the fourth stop position S4 and the slider 17 and the support arm 21 to prevent mutual contact. In addition, the support arm 21 of the first blade drive element 13 is formed so that the part of the support arm 21 that is bent from the inside of the blade drive element accommodation concave place 19 and extends above the work guide surface 12 produces a clearance δ2 between the part and the back surface of the second blade 7b that stops at the fourth stop position S4 to prevent mutual contact. As a result, the first blade 7a and the first blade drive element 13 do not collide with the second blade 7b and the second blade drive element 15 during operation and they operate smoothly.

The second blade drive element 15 includes a guide rail 27 that extends along the Y axis direction, a slider 28 that is engaged with the guide rail 27 so as to slidably move, a winding transmission device 30 that slidably moves the slider 28, a motor 31 that drives the winding transmission device 30, and a support arm 32 that fixes the second blade 7b to the slider 28. The guide rail 27 is fixed onto the work table 14 via a pair of support legs 33 and 33 and can reciprocate the second blade 7b between the third stop position S3 and the fourth stop position S4 by guiding the slider 28 in the direction along the Y axis. In addition, since the slider 28 has a dovetail groove to be slidably engaged with the guide rail 27 having a dovetail shape, the slider 28 smoothly moves along the guide rail 27 without coming off the guide rail 27. The winding transmission device 30 has a pair of pulleys 34 and 34 rotatably attached to the frame 23 of the device body and an endless wire belt 35 looped over the pair of pulleys 34 and 34. A hook 36 of the slider 28 is fixed to the wire belt 35. Accordingly, the slider 28 slidably moves on the guide rail 27 as the wire belt 35 runs. Then, one of the pair of pulleys 34 and 34 is rotated by the motor 31 and the other of the pair of pulleys 34 and 34 is driven by the rotation of one of the pair of pulleys 34 and 34 via the wire belt 35.

(Operation of the Powder Sintering Lamination Apparatus)

Figure 3A:
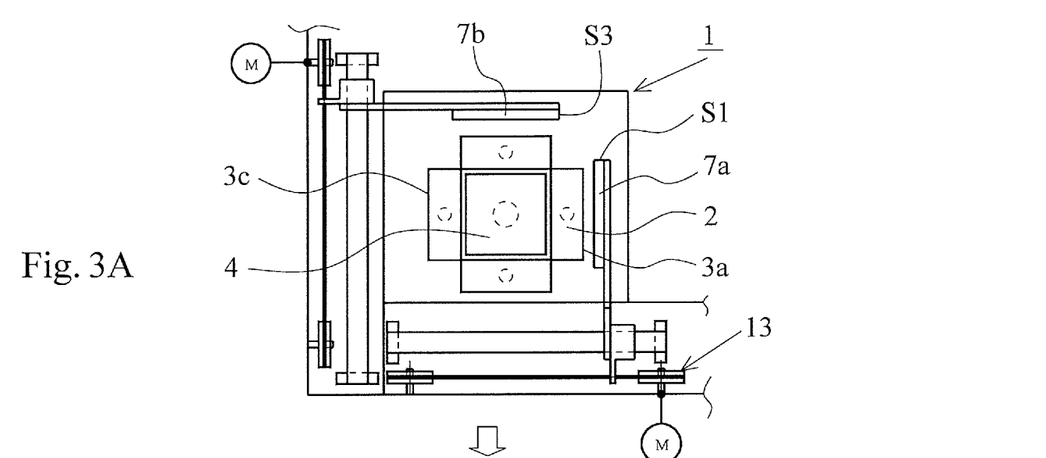
FIGS. 3A-3C are diagrams used to describe first operation of the powder sintering lamination apparatus according to the first embodiment of the invention.
Figure 3B:
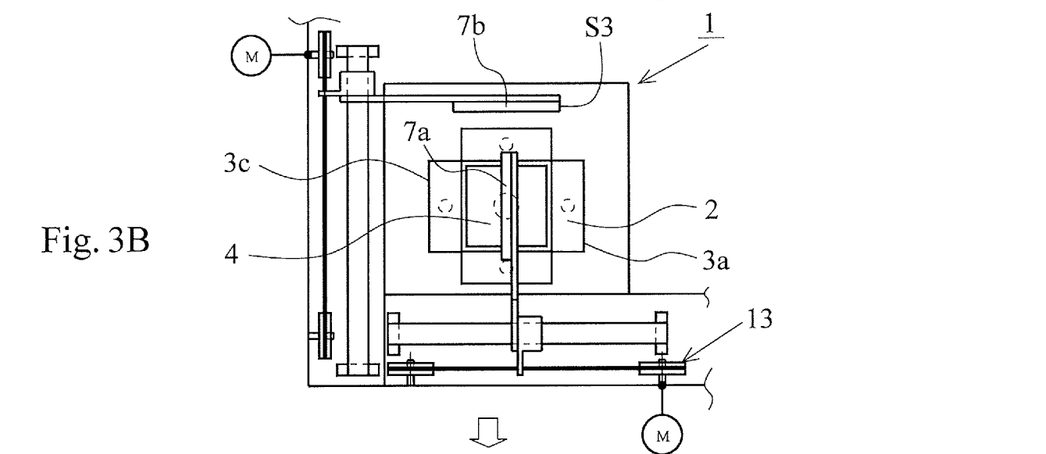
Figure 3C:
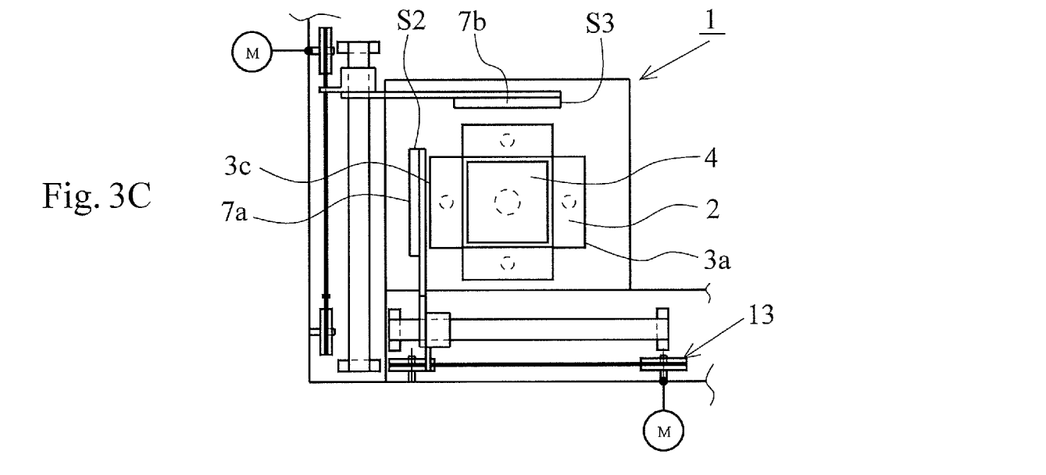

FIGS. 3A to 3C are diagrams used to describe the first operation of the powder sintering lamination apparatus 1 according to the embodiment. In this first operation, the first blade 7a carries the resin powder 2 in the first powder material tank 3a onto the shaping table 4 by being moved from the first stop position S1 to the second stop position S2 by the first blade drive element 13, forms the powder layer 6 having a predetermined thickness on the shaping table 4, and accommodates the excess resin powder 2 in the third powder material tank 3c. After that, the powder sintering lamination apparatus 1 irradiates a predetermined place of the powder layer 6 on the shaping table 4 with the laser light 8 from the laser light irradiation module 10 to sinter the part of the powder layer 6 irradiated with the laser light 8, thereby forming a first solidified layer 37 of fiber-containing resin on the shaping table 4 (see FIG. 2B). It should be noted here that the second blade 7b stops at the third stop position S3 in the first operation of the powder sintering lamination apparatus 1.

Figure 4A:
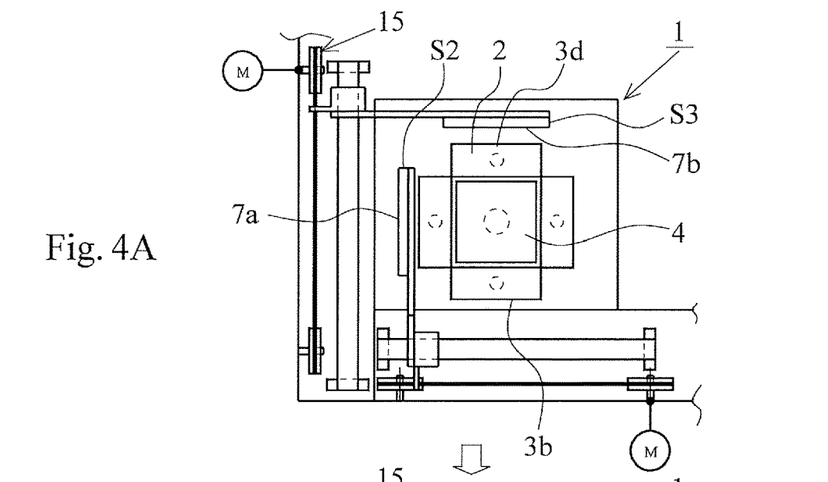
FIGS. 4A-4C are diagrams used to describe second operation of the powder sintering lamination apparatus according to the first embodiment of the invention.
Figure 4B:
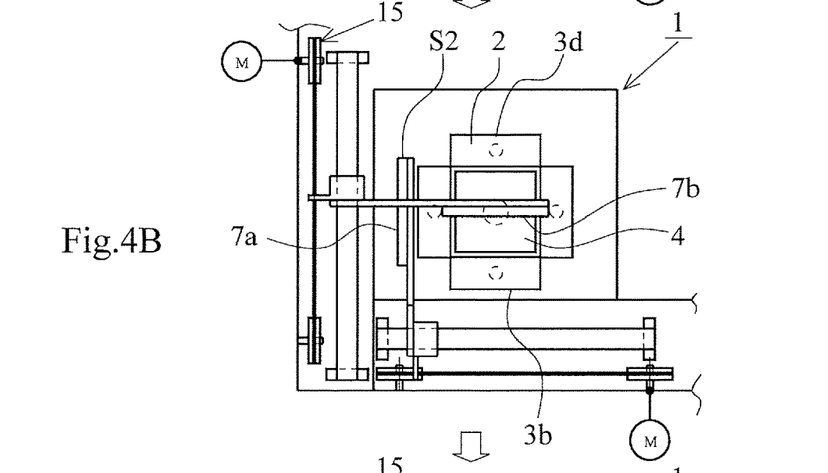
Figure 4C:
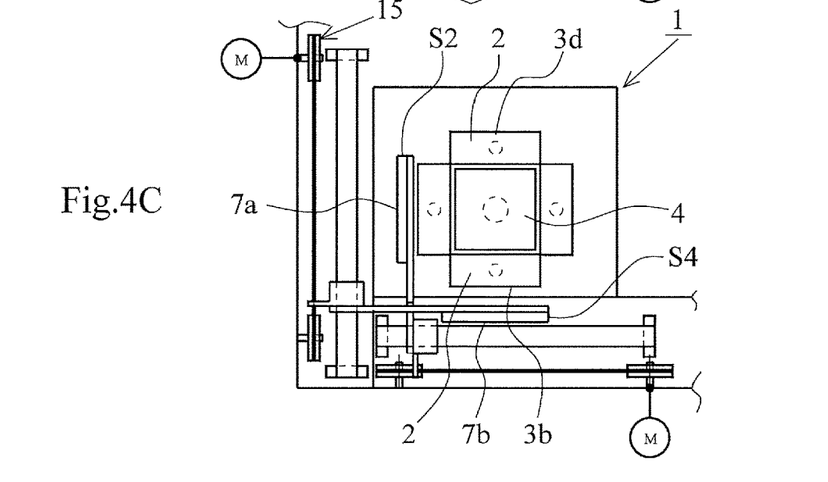

Next, FIGS. 4A to 4C are diagrams used to describe the second operation, which follows the first operation, of the powder sintering lamination apparatus 1 according to the embodiment. In this second operation, the second blade 7b carries the resin powder 2 in the fourth powder material tank 3d onto the shaping table 4 by being moved from the third stop position S3 to the fourth stop position S4 by the second blade drive element 15, forms the powder layer 6 having a predetermined thickness on the shaping table 4, and accommodates the excess resin powder 2 in the second powder material tank 3b. After that, the powder sintering lamination apparatus 1 irradiates a predetermined place of the powder layer 6 on the shaping table 4 with the laser light 8 from the laser light irradiation module 10 to sinter the part of the powder layer 6 irradiated with the laser light 8, thereby laminating a second solidified layer 37 of fiber-containing resin onto a first solidified layer 37 (see FIG. 2B). It should be noted here that the first blade 7a stops at the second stop position S2 in the second operation of the powder sintering lamination apparatus 1.

Figure 5A:
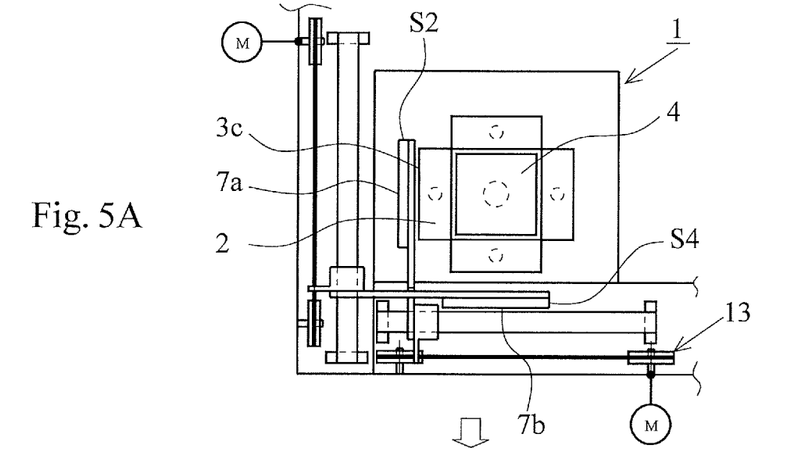
FIGS. 5A-5C are diagrams used to describe third operation of the powder sintering lamination apparatus according to the first embodiment of the invention.
Figure 5B:
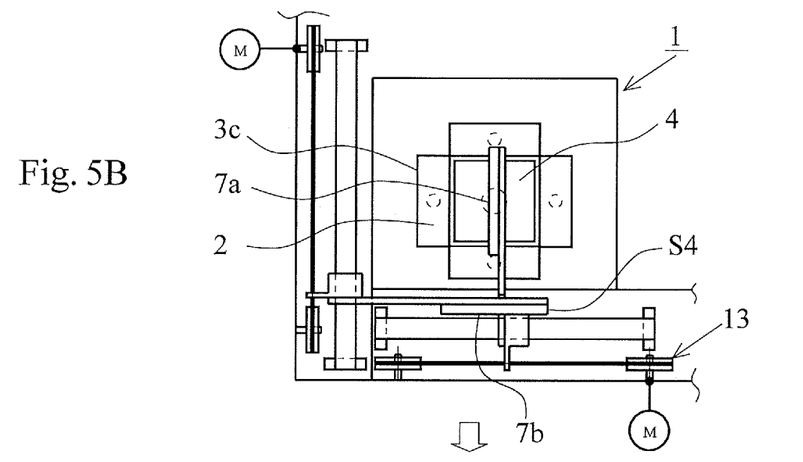
Figure 5C:
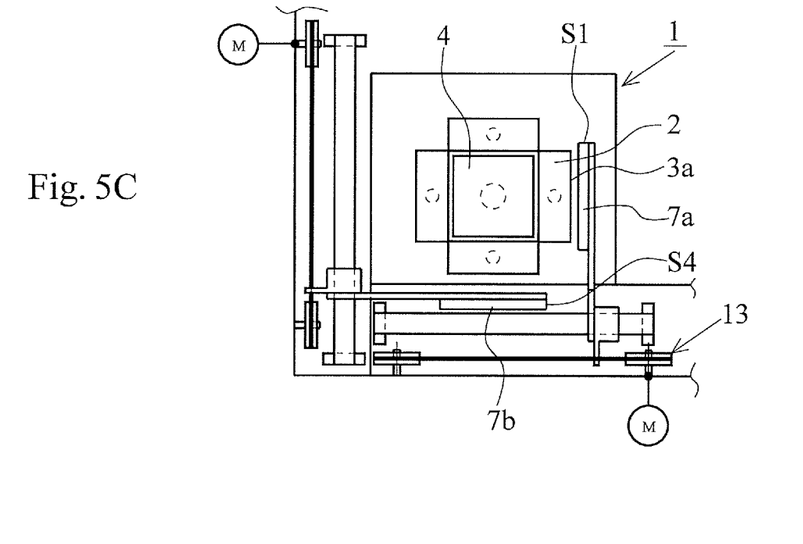

Next, FIGS. 5A to 5C are diagrams used to describe the third operation, which follows the second operation, of the powder sintering lamination apparatus 1 according to the embodiment. In this third operation, the first blade 7a carries the resin powder 2 in the third powder material tank 3c onto the shaping table 4 by being moved from the second stop position S2 to the first stop position S1 by the first blade drive element 13, forms the powder layer 6 having a predetermined thickness on the shaping table 4, and accommodates the excess resin powder 2 in the first powder material tank 3a. After that, the powder sintering lamination apparatus 1 irradiates a predetermined place of the powder layer 6 on the shaping table 4 with the laser light 8 from the laser light irradiation module 10 to sinter the part of the powder layer 6 irradiated with the laser light 8, thereby laminating a third solidified layer 37 of fiber-containing resin onto the second solidified layer 37 (see FIG. 2B). It should be noted here that the second blade 7b stops at the fourth stop position S4 in the third operation of the powder sintering lamination apparatus 1.

Figure 6A:
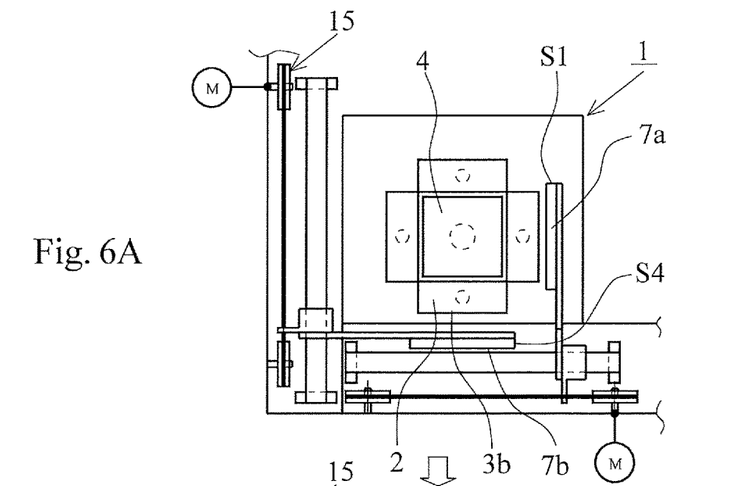
FIGS. 6A-6C are diagrams used to describe fourth operation of the powder sintering lamination apparatus according to the first embodiment of the invention.
Figure 6B:
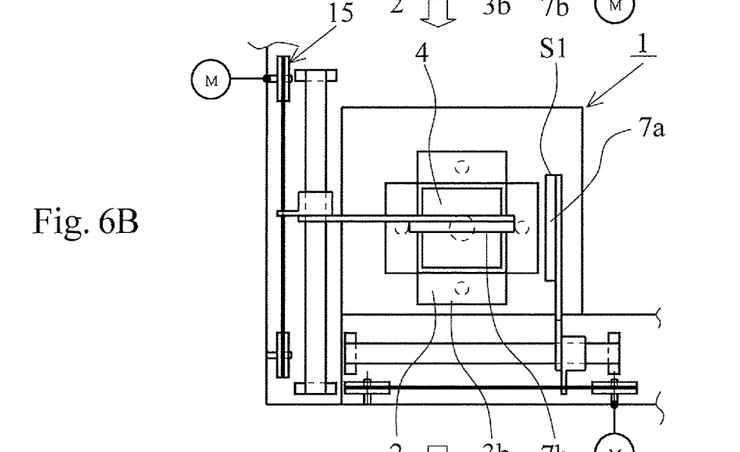
Figure 6C:
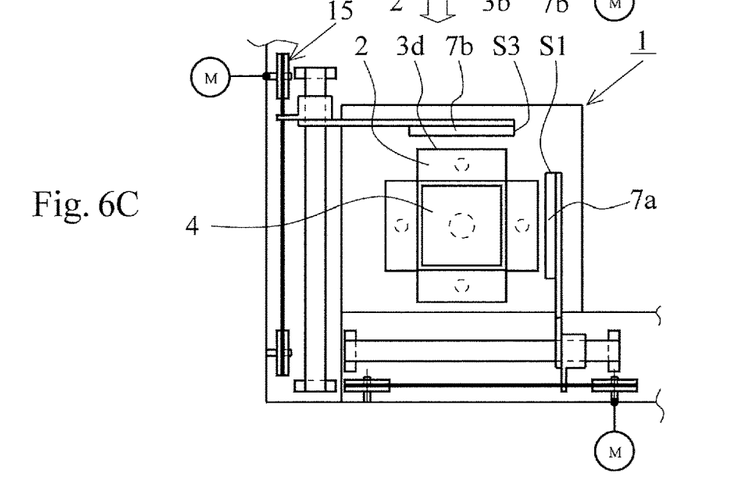

Next, FIGS. 6A to 6C are diagrams used to describe the fourth operation, which follows the third operation, of the powder sintering lamination apparatus 1 according to the embodiment. In this fourth operation, the second blade 7b carries the resin powder 2 in the second powder material tank 3b onto the shaping table 4 by being moved from the fourth stop position S4 to the third stop position S3 by the second blade drive element 15, forms the powder layer 6 having a predetermined thickness on the shaping table 4, and accommodates the excess resin powder 2 in the fourth powder material tank 3d. After that, the powder sintering lamination apparatus 1 irradiates a predetermined place of the powder layer 6 on the shaping table 4 with the laser light 8 from the laser light irradiation module 10 to sinter the part of the powder layer 6 irradiated with the laser light 8, thereby laminating a fourth solidified layer 37 of fiber-containing resin onto the third solidified layer 37 (see FIG. 2B). It should be noted here that the first blade 7a stops at the first stop position S1 in the fourth operation of the powder sintering lamination apparatus 1.

As described above, the powder sintering lamination apparatus 1 according to the embodiment operates the first blade 7a and the second blade 7b alternately and laminates the plurality of solidified layers 37 of fiber-containing resin integrally with each other, thereby forming a three-dimensional shaped object 38 on the shaping table 4 (see FIG. 2B).

Figure 7A:
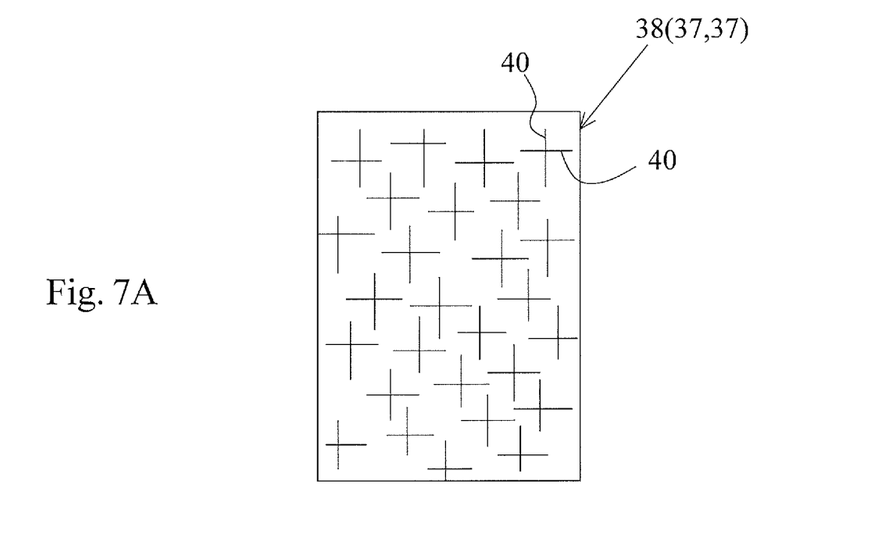
FIG. 7A illustrates the fiber orientations of a three-dimensional shaped object molded by the powder sintering lamination apparatus according to the first embodiment of the invention and FIG. 7B illustrates the fiber orientations of a three-dimensional shaped object molded by the conventional powder sintering lamination apparatus.
Figure 7B:
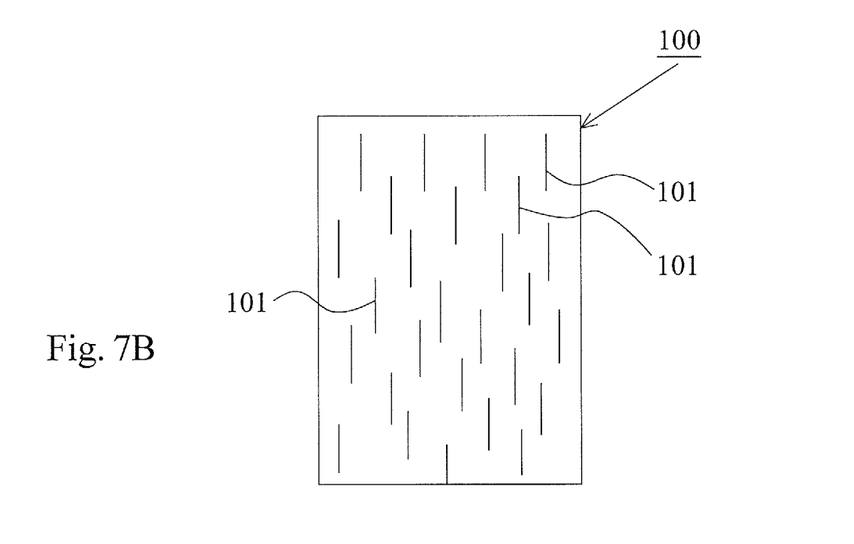

FIG. 7A schematically illustrates the fiber orientations of the three-dimensional shaped object 38 formed by the powder sintering lamination apparatus 1 according to the embodiment. Since the first blade 7a and the second blade 7b operate alternately and the movement track of the first blade 7a orthogonally intersects with the movement track of the second blade 7b as illustrated in FIG. 7A, fibers 40 and 40 of the solidified layers 37 and 37 vertically adjacent to each other intersect orthogonally. As a result, in the three-dimensional shaped object 38 formed by the powder sintering lamination apparatus 1 according to the embodiment, even when the fiber-containing resin powder 2 is used as the powder material, the strength and the dimensional accuracy do not differ (vary) significantly between directions (for example, the X axis direction and the Y axis direction) on the X-Y plane. It should be noted here that FIG. 7B illustrates the fiber orientations of the three-dimensional shaped object 100 formed by the conventional powder sintering lamination apparatus. As illustrated in FIG. 7B, since the blade moves in one direction in the conventional powder sintering lamination apparatus, the orientations of the fibers 101 are aligned in one direction when fiber-containing resin powder is used as the powder material, the strength and the dimensional accuracy of the three-dimensional shaped object 100 differs significantly between directions (for example, the X axis direction and the Y axis direction on the X-Y plane).

(Effect of the First Embodiment)

Since the solidified layers 37 and 37 are laminated so that the orientations of the fibers 40 and 40 of the solidified layers 37 and 37 are orthogonally intersect with each other when the fiber-containing resin powder 2 is used as the powder material in the powder sintering lamination apparatus 1 according to the embodiment as described above, the strength and the dimensional accuracy of the three-dimensional shaped object 38 do not differ significantly between directions (for example, the X axis direction and the Y axis direction on the X-Y plane).

(Modification of the Powder Sintering Lamination Apparatus)

FIG. 8 to FIG. 11 illustrate the modification of the powder sintering lamination apparatus 1. In the powder sintering lamination apparatus 1 according to the modification, the first blade 7a reciprocates once between the first stop position S1 and the second stop position S2 and then the second blade 7b reciprocates once between the third stop position S3 and the fourth stop position S4. That is, the first blade 7a and the second blade 7b alternately move on the shaping table 4 for each reciprocating motion. The first operation to the fourth operation of the powder sintering lamination apparatus 1 according to the modification will be described in detail below.

Figure 8A:
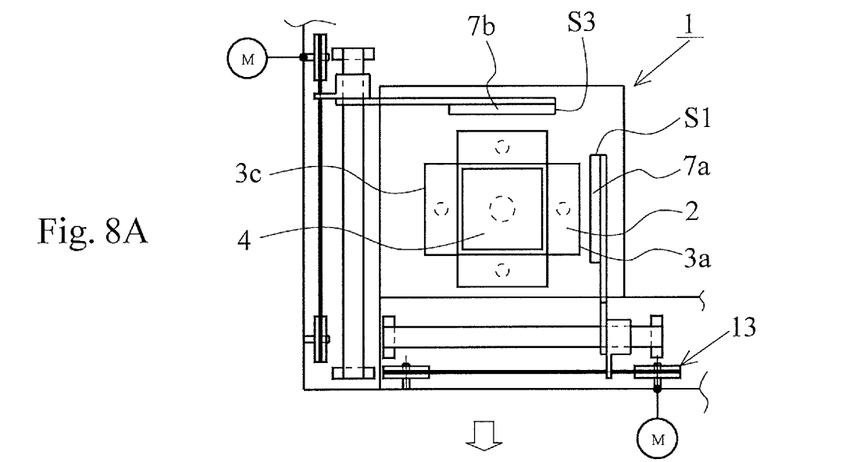
FIGS. 8A-8C are diagrams used to describe first operation of a powder sintering lamination apparatus according to a modification of the invention.
Figure 8B:
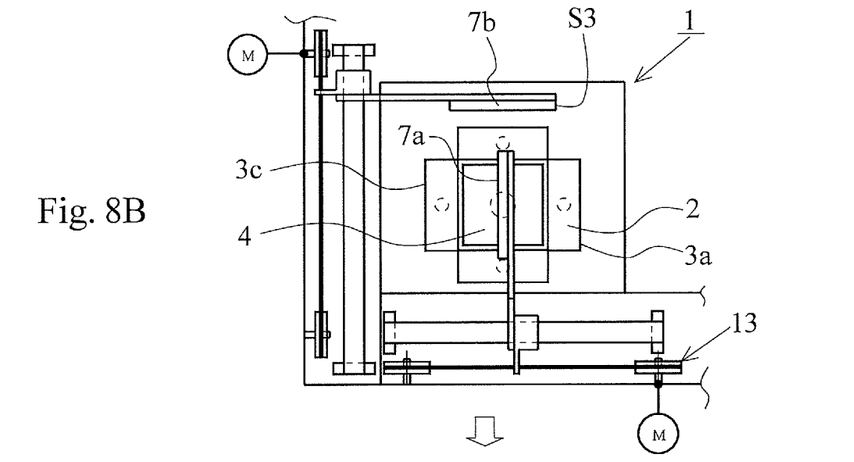
Figure 8C:
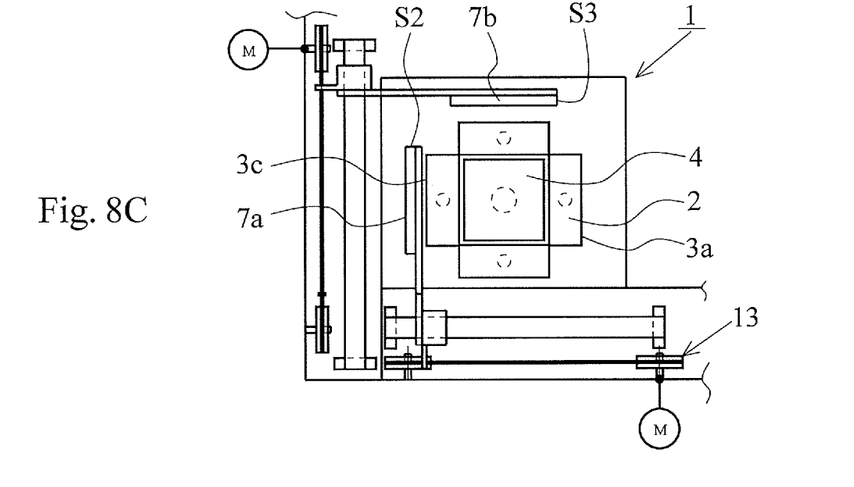

FIGS. 8A to 8C illustrate the first operation of the powder sintering lamination apparatus 1 according to the modification. In the first operation, the first blade 7a carries the resin powder 2 in the first powder material tank 3a onto the shaping table 4 by being moved from the first stop position S1 to the second stop position S2 by the first blade drive element 13 and forms the powder layer 6 having a predetermined thickness on the shaping table 4. After that, the powder sintering lamination apparatus 1 irradiates a predetermined place of the powder layer 6 with the laser light 8 from the laser light irradiation module 10 and sinters the part of the powder layer 6 irradiated with the laser light 8 to form the first solidified layer 37 of fiber-containing resin on the shaping table 4 (see FIG. 2B). It should be noted here that the second blade 7b stops at the third stop position S3 in the first operation of the powder sintering lamination apparatus 1.

Figure 9A:
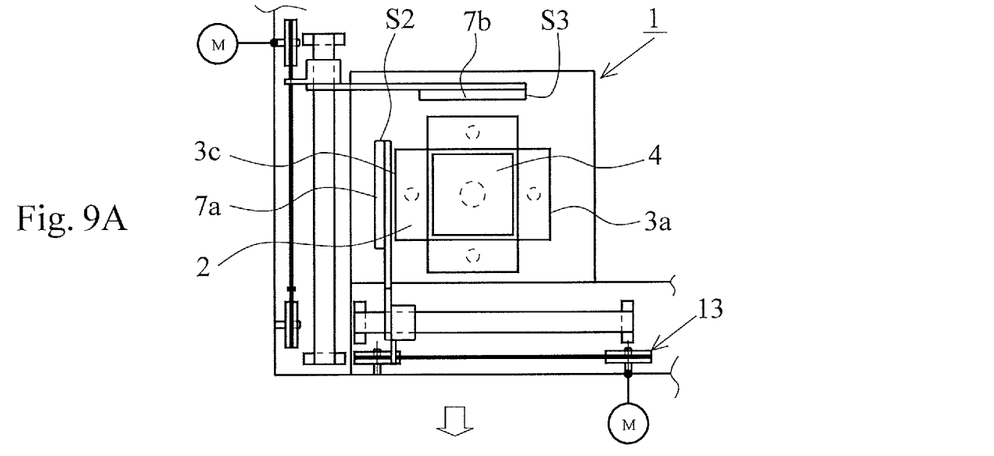
FIGS. 9A-9C are diagrams used to describe second operation of the powder sintering lamination apparatus according to the modification of the invention.
Figure 9B:
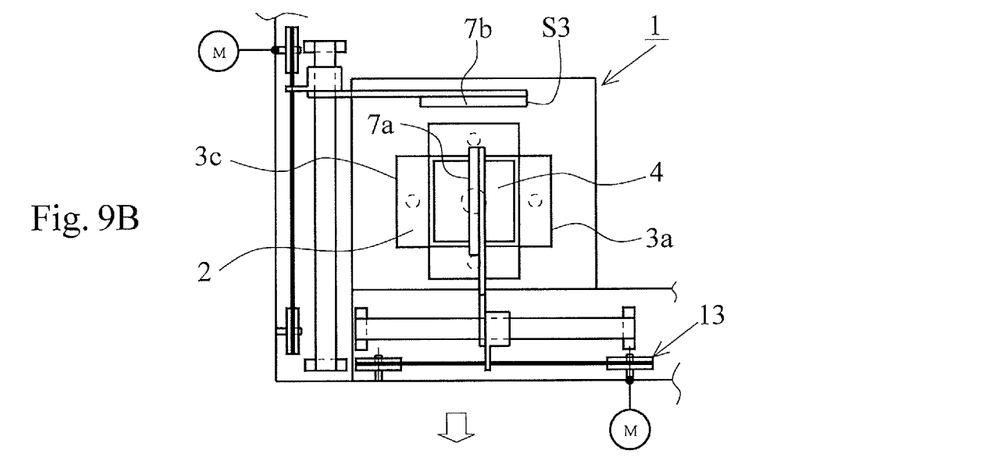
Figure 9C:
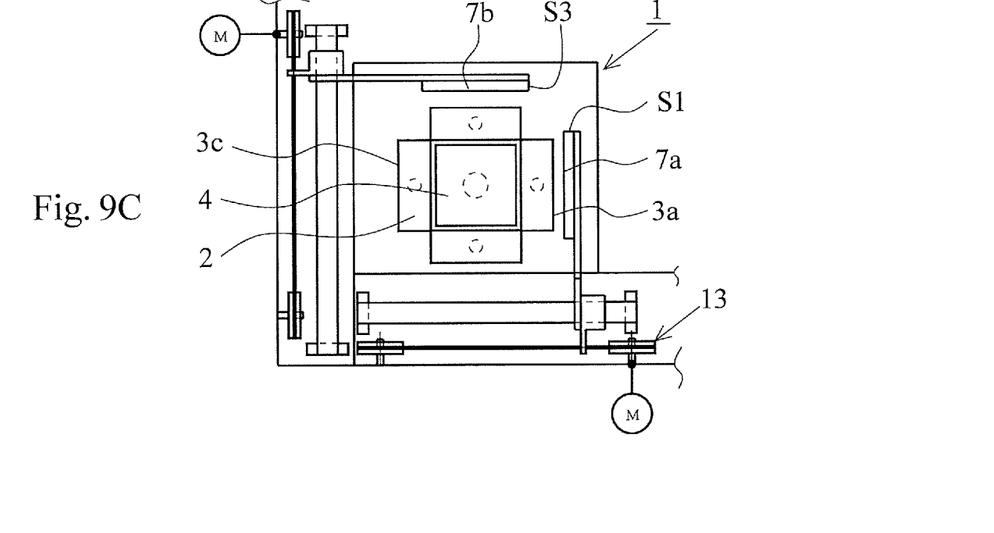

Next, FIGS. 9A to 9C illustrate the second operation, which follows the first operation, of the powder sintering lamination apparatus 1 according to the modification. In the second operation, the first blade 7a carries the resin powder 2 in the third powder material tank 3c onto the shaping table 4 by being moved from the second stop position S2 to the first stop position S1 by the first blade drive element 13 and forms the powder layer 6 having a predetermined thickness on the shaping table 4. After that, the powder sintering lamination apparatus 1 irradiates a predetermined place of the powder layer 6 with the laser light 8 from the laser light irradiation module 10 and sinters the part of the powder layer 6 irradiated with the laser light 8, thereby laminating the second solidified layer 37 of fiber-containing resin onto the first solidified layer 37 (see FIG. 2B). It should be noted here that the second blade 7b stops at the third stop position S3 in the second operation of the powder sintering lamination apparatus 1.

Figure 10A:
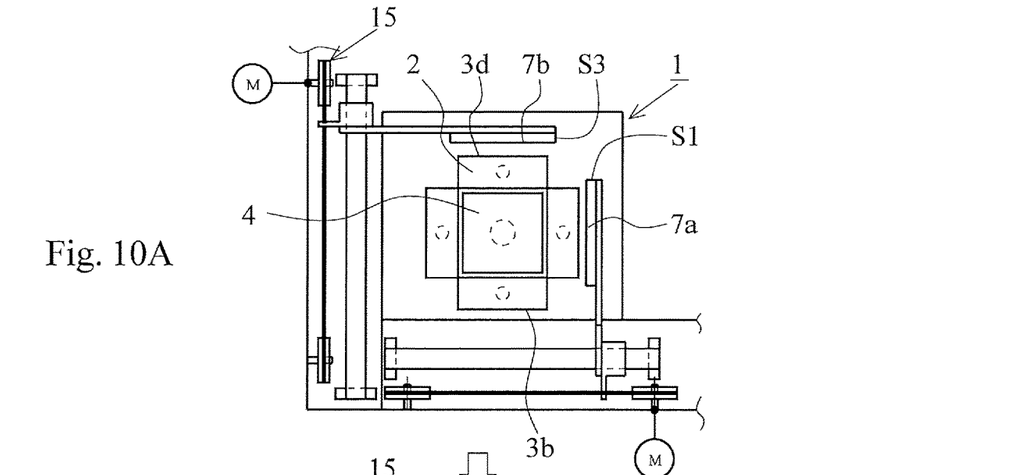
FIGS. 10A-10C are diagrams used to describe third operation of the powder sintering lamination apparatus according to the modification of the invention.
Figure 10B:
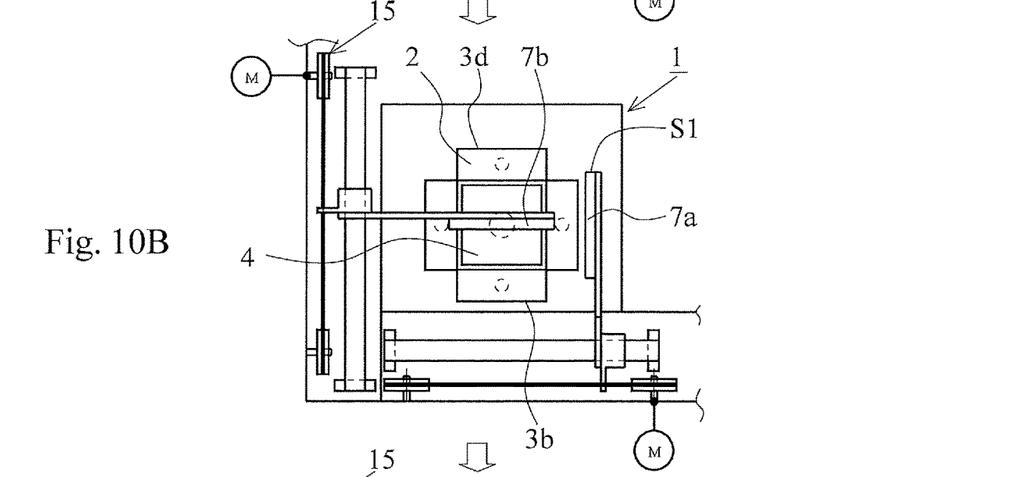
Figure 10C:
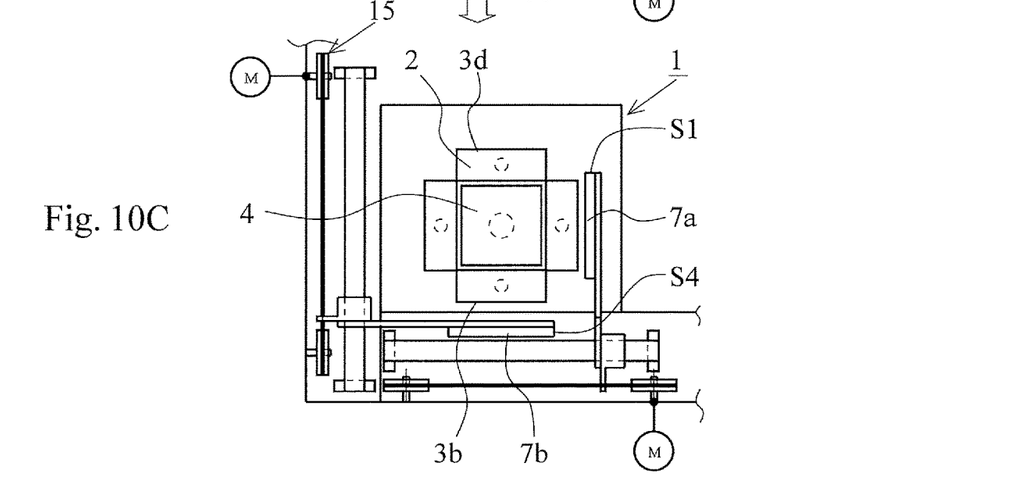

Next, FIGS. 10A to 10C illustrate the third operation, which follows the second operation, of the powder sintering lamination apparatus 1 according to the modification. In the third operation, the second blade 7b carries the resin powder 2 in the fourth powder material tank 3d onto the shaping table 4 by being moved from the third stop position S3 to the fourth stop position S4 by the second blade drive element 15 and forms the powder layer 6 having a predetermined thickness on the shaping table 4. After that, the powder sintering lamination apparatus 1 irradiates a predetermined place of the powder layer 6 with the laser light 8 from the laser light irradiation module 10 and sinters the part of the powder layer 6 irradiated with the laser light 8, thereby laminating the third solidified layer 37 of fiber-containing resin onto the second solidified layer 37 (see FIG. 2B). It should be noted here that the first blade 7a stops at the first stop position S1 in the third operation of the powder sintering lamination apparatus 1.

Figure 11A:
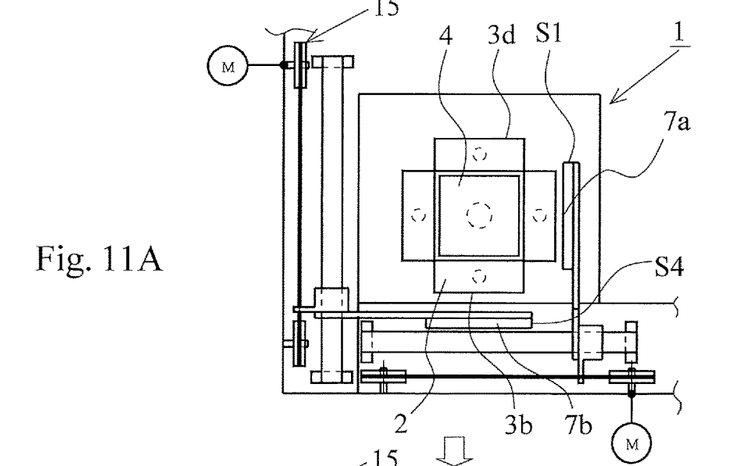
FIGS. 11A-11C are diagrams used to describe fourth operation of the powder sintering lamination apparatus according to the modification of the invention.
Figure 11B:
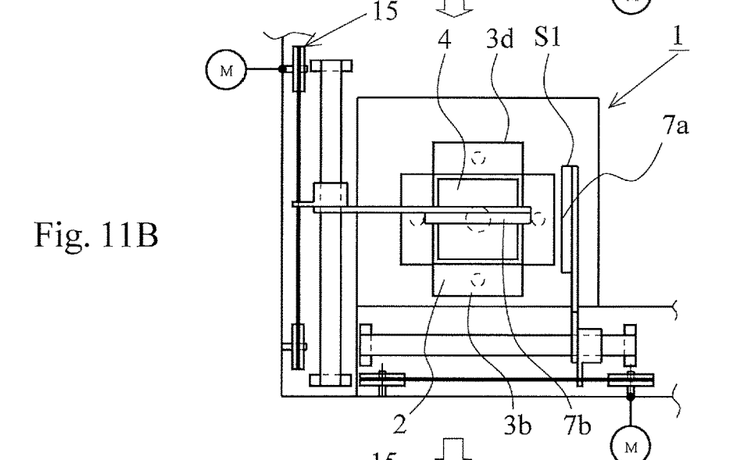
Figure 11C:
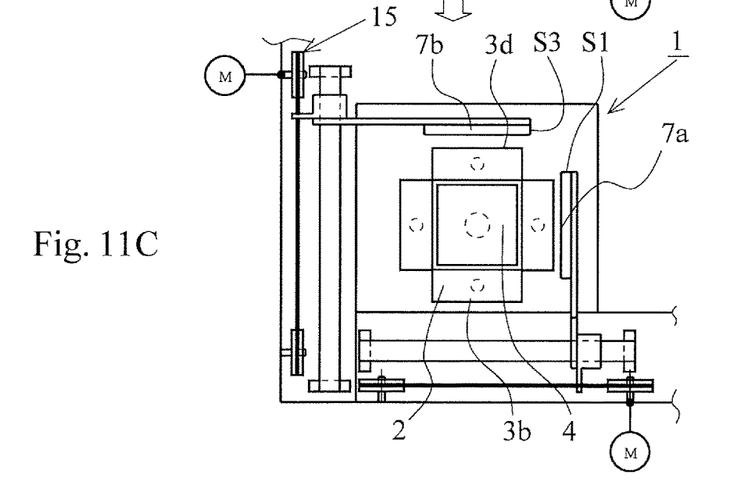

Next, FIGS. 11A to 11C illustrate the fourth operation, which follows the third operation, of the powder sintering lamination apparatus 1 according to the modification. In the fourth operation, the second blade 7b carries the resin powder 2 in the second powder material tank 3b onto the shaping table 4 by being moved from the fourth stop position S4 to the third stop position S3 by the second blade drive element 15 and forms the powder layer 6 having a predetermined thickness on the shaping table 4. After that, the powder sintering lamination apparatus 1 irradiates a predetermined place of the powder layer 6 with the laser light 8 from the laser light irradiation module 10 and sinters the part of the powder layer 6 irradiated with the laser light 8, thereby laminating the fourth solidified layer 37 of fiber-containing resin onto the third solidified layer 37 (see FIG. 2B). It should be noted here that the first blade 7a stops at the first stop position S1 in the fourth operation of the powder sintering lamination apparatus 1.

As described above, the first blade 7a and the second blade 7b operate alternately for each reciprocating motion in the powder sintering lamination apparatus 1 according to the modification. Accordingly, when the fiber-containing resin powder 2 is used as the powder material in the powder sintering lamination apparatus 1 according to the modification, since the solidified layers 37 are laminated alternately so that the orientations of the fibers 40 and 40 orthogonally intersect with each other every two solidified layers 37, the strength and dimensional accuracy of the three-dimensional shaped object 38 do not differ significantly between directions (for example, the X axis direction and the Y axis direction on the X-Y plane).

Second Embodiment

Figure 12:
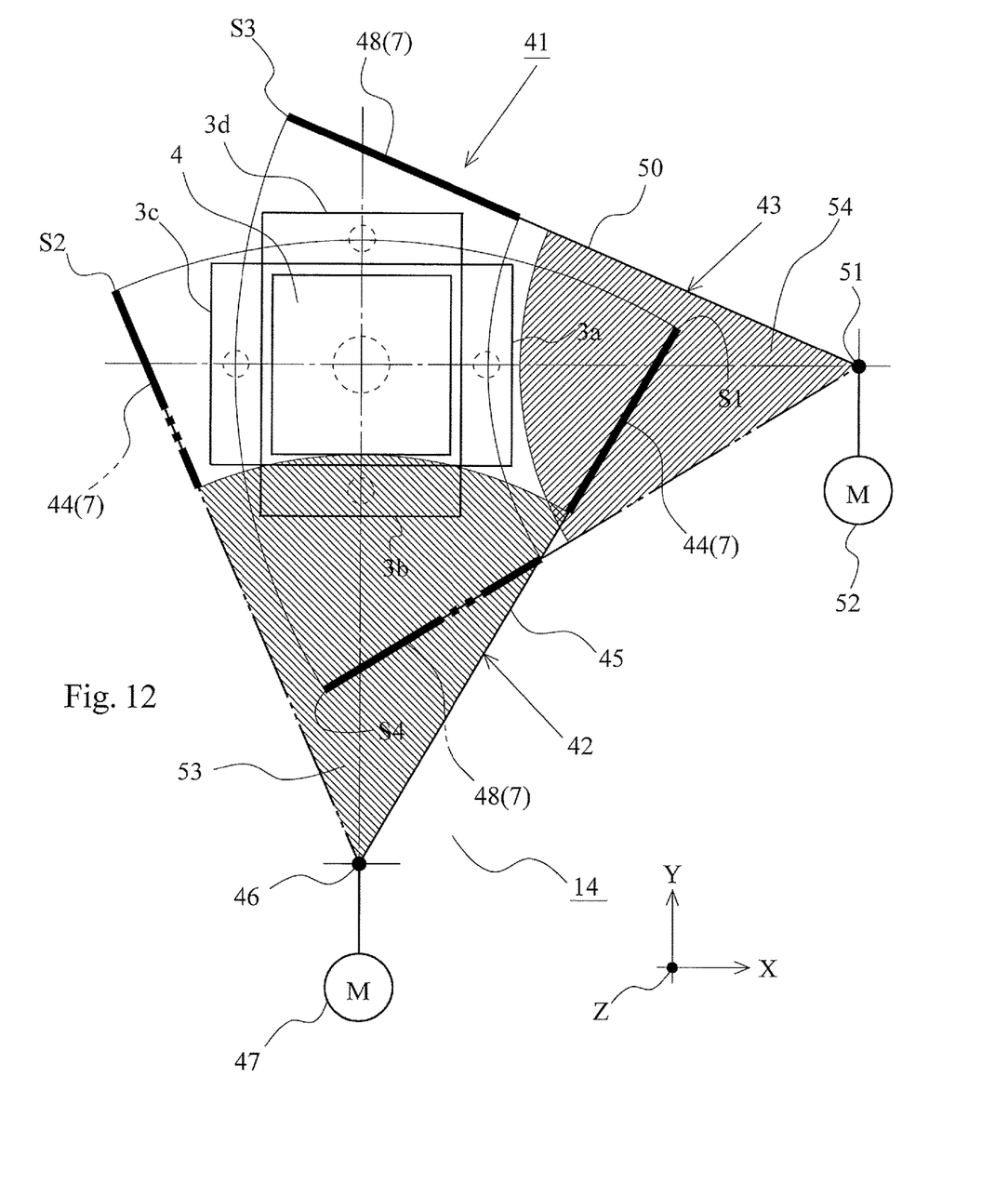
FIG. 12 is a plan view schematically illustrating a powder sintering lamination apparatus according to a second embodiment.

FIG. 12 is a plan view schematically illustrating a powder sintering lamination apparatus 41 according to the second embodiment of the invention. In the powder sintering lamination apparatus 41 according to the embodiment illustrated in FIG. 12, first blade drive element 42 and second blade drive element 43 are different from the first blade drive element 13 and the second blade drive element 15 according to the first embodiment. That is, the first blade drive element 42 according to the second embodiment has a pivot arm 45 to which a first blade 44 (first flattening mechanism) has been fixed, a pivot support shaft 46 that pivotably supports this pivot arm 45 via the work table 14, and a motor 47 that pivots the pivot arm 45 via the pivot support shaft 46. In addition, the second blade drive element 43 has a pivot arm 50 to which a second blade 48 (second flattening mechanism) has been fixed, a pivot support shaft 51 that pivotably supports the pivot arm 50 via the work table 14, and a motor 52 that pivots the pivot arm 50 via the pivot support shaft 51. It should be noted here that the motors 47 and 52 are connected to the pivot support shafts 46 and 51 via a gear train (not illustrated).

In the above-described powder sintering lamination apparatus 41 according to the embodiment, the track formed when the first blade 44 pivots from the first stop position S1 to the second stop position S2 about the pivot support shaft 46 intersects with the track formed when the second blade 48 pivots from the third stop position S3 to the fourth stop position S4 about the pivot support shaft 51 on the shaping table 4. In the powder sintering lamination apparatus 41 according to the embodiment, the first blade 44 is moved from the first stop position S1 to the second stop position S2, the second blade 48 is moved from the third stop position S3 to the fourth stop position S4, the first blade 44 is returned from the second stop position S2 to the first stop position S1, and the second blade 48 is returned from the fourth stop position S4 to the third stop position S3. It should be noted here that, in FIG. 12, a first hatched part 53 represents the movement range of the part of the pivot arm 45, positioned above the second blade 48 and the pivot arm 50, that needs to be prevent from making contact with the second blade 48 and the pivot arm 50. A second hatched part 54 represents the movement range of the part of the pivot arm 50, positioned below the first blade 44, that needs to be prevented from making contact with the first blade 44.

In the powder sintering lamination apparatus 41 according to the embodiment operated as described above, since the solidified layers are laminated with each other so that the fiber orientations of laminated solidified layers intersect with each other when fiber-containing resin powder is used as the powder material, the strength and dimensional accuracy of a three-dimensional shaped object do not differ significantly between directions (for example, the X axis direction and the Y axis direction on the X-Y plane).

It should be noted here that the pivot arm 45 to which the first blade 44 has been fixed is displaced from the pivot arm 50 to which the second blade 48 has been fixed in the direction (z axis direction) orthogonal to the paper surface of FIG. 8 in the powder sintering lamination apparatus 41 according to the embodiment. In addition, in the powder sintering lamination apparatus 41 according to the embodiment, the stop positions (S1 to S4) are determined so that the first blade 44 does not collide with the second blade 48 in the pivot range. In addition, the pivot arm 45 of the first blade drive element 42 and the pivot arm 50 of the second blade drive element 43 are designed so as to have the maximum allowable pivot radiuses.

In addition, in the powder sintering lamination apparatus 41 according to the embodiment, the first blade 44 and the second blade 48 may be operated alternately for each reciprocating motion as in the modification of the first embodiment.

OTHER EMBODIMENTS

The powder sintering lamination apparatus according to the invention is not limited to the powder sintering lamination apparatuses 1 and 41 according to the first embodiment, the second embodiment, and the modifications thereof described above as long as the powder layer 6 formed by the first blade 7a, 44 and the powder layer 6 formed by the second blade 7b, 48 are laminated with each other on the shaping table 4, the solidified layers 37 are laminated with each other so that the orientations of fibers 40 intersect with each other on the shaping table 4, and the strength and dimensional accuracy of the three-dimensional shaped object 38 do not differ significantly between directions (for example, the X axis direction and the Y axis direction on the X-Y plane). For example, in the powder sintering lamination apparatus according to the invention, the first blade 7a, 44 and the second blade 7b, 48 may alternately form the powder layer 6 and the solidified layer 37 every three layers and may form the three-dimensional shaped object 38 in which the orientations of the fibers 40 and 40 intersect every three solidified layers. In addition, in the first embodiment, the powder sintering lamination apparatus according to the invention may cause the first blade 7a to perform the first operation, the second blade 7b to perform the second operation and the fourth operation (perform one reciprocating motion), and then the first blade 7a to perform the third operation. In addition, the powder sintering lamination apparatus 1 according to the modification illustrated in FIG. 8 to FIG. 11 may cause only the first blade 7a to perform the first operation (operation in the outward direction) or only the second blade 7b to perform the third operation (operation in the outward direction) when forming the powder layer 6 at the top. In this case, when the powder layer 6 at the top is formed by the first operation of the first blade 7a, the powder layer 6 immediately below (immediately below the powder layer 6 at the top) is preferably formed by the second blade 7b. Alternatively, when the powder layer 6 at the top is formed by the third operation of the second blade 7b, the powder layer 6 immediately below (immediately below the powder layer 6 at the top) is preferably formed by the first blade 7b.

In the first embodiment and the second embodiment described above, the blades 7a, 7b, 44, and 48 are illustrated as the flattening device 7. However, the invention is not limited to the first embodiment and the second embodiment described above and a roller may be used as the flattening device 7.

In addition, in the powder sintering lamination apparatuses 1 and 41 according the first embodiment and the second embodiment described above, resin powder, metal powder, or ceramics powder containing no fiber may be used in place of the fiber-containing resin material 2 as the powder material to form the three-dimensional shaped object 38.

REFERENCE SIGNS LIST

1, 41: powder sintering lamination apparatus
4: shaping table
6: powder layer
7a, 44: first blade (first flattening mechanism)
7b, 48: second blade (second flattening mechanism)
8: laser light
10: laser light irradiation module
37: solidified layer
38: three-dimensional shaped object

The invention claimed is:
1. A powder sintering lamination apparatus comprising:
a shaping table;
a plurality of powder material tanks for containing fiber-containing resin powder material;
a flattening device configured to move across the shaping table, and to supply the fiber-containing resin powder material from the plurality of powder material tanks onto the shaping table so as to form powder layers having a predetermined thickness from the fiber-containing resin powder material supplied onto the shaping table; and
a laser light irradiation module configured to irradiate a predetermined place of each of the powder layers on the shaping table with laser light so as to sinter a part of the powder layer irradiated with the laser light to form solidified layers, a three-dimensional shaped object being formed by laminating the solidified layers integrally with each other on the shaping table, wherein the flattening device includes a first flattening mechanism configured to move in a first direction and a second direction opposite the first direction, and a second flattening mechanism configured to move in a third direction and a fourth direction opposite the third direction, the first direction, the second direction, the third direction, and the fourth direction all being different directions, wherein a movement track of the first flattening mechanism on the shaping table intersects with a movement track of the second flattening mechanism on the shaping table, wherein the plurality of powder material tanks includes a first pair of powder material tanks provided in front of and behind, respectively, the shaping table with respect to a moving direction of the first flattening mechanism, and a second pair of powder material tanks provided in front of and behind, respectively, the shaping table with respect to a moving direction of the second flattening mechanism, wherein the flattening device is configured to form a first set of laminated powder layers on the shaping table by moving the first flattening mechanism across the shaping table in each of the first direction and the second direction, and to form a second set of laminated powder layers on the shaping table by moving the second flattening mechanism across the shaping table in each of the third direction and the fourth direction, and wherein the shaping table, the plurality of powder material tanks, and the flattening device are configured such that, during each movement of the first flattening mechanism in each of the first direction and the second direction, the fiber-containing resin powder material is carried from a first one of the first pair of powder material tanks to the shaping table to form the first set of laminated powder layers, and excess fiber-containing resin powder material is deposited in the second one of the first pair of powder material tanks, and such that, during each movement of the second flattening mechanism in each of the third direction and the fourth direction, the fiber-containing resin powder material is carried from a first one of the second pair of powder material tanks to the shaping table to form the second set of laminated powder layers, and excess fiber-containing resin powder material is deposited in the second one of the second pair of powder material tanks.

2. The powder sintering lamination apparatus according to claim 1, wherein the first flattening mechanism and the second flattening mechanism are configured to move alternately across the shaping table.

3. The powder sintering lamination apparatus according to claim 1, wherein the first flattening mechanism and the second flattening mechanism are configured to move alternately for each reciprocating motion on the shaping table.

4. The powder sintering lamination apparatus according to claim 1, wherein the movement track of the first flattening mechanism on the shaping table orthogonally intersects with the movement track of the second flattening mechanism on the shaping table.

5. The powder sintering lamination apparatus according to claim 2, wherein the powder sintering lamination apparatus is configured to move the first flattening mechanism and the second flattening mechanism alternately across the shaping table such that the first flattening mechanism moves in the first direction to form a first one of the first set of laminated powder layers, the second flattening mechanism then moves in the third direction to form a first one of the second set of laminated powder layers on the first one of the first set of laminated powder layers, the first flattening mechanism then moves in the second direction opposite the first direction to form a second one of the first set of laminated powder layers on the first one of the second set of laminated powder layers, and the second flattening mechanism then moves in the fourth direction opposite the third direction to form a second one of the second set of laminated powder layers on the second one of the first set of laminated powder layers.

* * * * *